US012355134B2

(12) United States Patent
Anderson et al.

(10) Patent No.: US 12,355,134 B2
(45) Date of Patent: Jul. 8, 2025

(54) MODULAR TAPERED SLOT ANTENNA FEED STRUCTURE METHOD OF USE AND KIT

(71) Applicant: USA as Represented by the Secretary of the Navy, Arlington, VA (US)

(72) Inventors: Ryan Joseph Anderson, San Diego, CA (US); Dennis G. Bermeo, San Diego, CA (US); Jessica L. Watson, Santee, CA (US); David Walker Brock, San Diego, CA (US); Kemakeo K. Wilson, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 154 days.

(21) Appl. No.: 18/341,265

(22) Filed: Jun. 26, 2023

(65) Prior Publication Data

US 2024/0429616 A1 Dec. 26, 2024

(51) Int. Cl.

*H01Q 1/12* (2006.01)
*H01Q 1/38* (2006.01)
*H01Q 1/50* (2006.01)
*H01Q 13/08* (2006.01)

(52) U.S. Cl.

CPC ......... *H01Q 1/1207* (2013.01); *H01Q 1/1235* (2013.01); *H01Q 1/38* (2013.01); *H01Q 1/50* (2013.01); *H01Q 13/085* (2013.01)

(58) Field of Classification Search

CPC ............ H01Q 1/08; H01Q 1/088; H01Q 1/12; H01Q 1/1207; H01Q 1/1235; H01Q 1/36; H01Q 1/38; H01Q 1/50; H01Q 5/25; H01Q 13/04; H01Q 13/08; H01Q 13/085

See application file for complete search history.

(56) References Cited

U.S. PATENT DOCUMENTS

| | | | | |
|---|---|---|---|---|
| 5,036,335 | A | 7/1991 | Jairam | |
| 6,317,094 | B1 | 11/2001 | Wu et al. | |
| 7,075,493 | B2 | 7/2006 | Azadegan et al. | |
| 7,397,439 | B2 | 7/2008 | Kanno et al. | |
| 7,679,575 | B1 * | 3/2010 | Horner ................ | H01Q 21/205 343/768 |
| 8,269,685 | B2 | 9/2012 | McQuaid et al. | |
| 8,279,128 | B2 | 10/2012 | McQuaid et al. | |
| 8,350,773 | B1 | 1/2013 | Kindt | |
| 9,041,613 | B1 | 5/2015 | Lin et al. | |

(Continued)

OTHER PUBLICATIONS

Kim et al., "Characterization of Tapered Slot Antenna Feeds and Feed Arrays", IEEE Transactions on Antennas and Propagation, vol. 38, No. 10, Oct. 1990, pp. 1559-1564.

(Continued)

*Primary Examiner* — Robert Karacsony

(74) *Attorney, Agent, or Firm* — Naval Information Warfare Center Pacific; Kyle Eppele; Paul C. Oestreich

(57) ABSTRACT

Embodiments of the present invention are directed to a modular, lock and key, tapered slot antenna feed structure, antenna kits including same and methods of use. The invention allows for quick assembly and separation of opposed blades. The invention provides a repeatable tight tolerance feed gap during every assembly. Components of the tapered slot antenna feed structure may be additively manufactured and selectively plated.

20 Claims, 10 Drawing Sheets

(56) References Cited

U.S. PATENT DOCUMENTS

| | | | | |
|---|---|---|---|---|
| 9,306,289 | B1 * | 4/2016 | Bermeo | H01Q 13/085 |
| 9,991,606 | B2 | 6/2018 | Elsallal et al. | |
| 10,541,467 | B1 | 1/2020 | Brigham et al. | |
| 10,854,993 | B2 | 12/2020 | Franzini et al. | |
| 10,886,625 | B2 | 1/2021 | Franzini et al. | |
| 2019/0252787 | A1 | 8/2019 | McGrath et al. | |

OTHER PUBLICATIONS

Unadkat et al., "Design of Corrugated Linearly Tapered Slot Antenna for Wireless Apps", Lambert Academic Publishing, ISBN: 978-3-659-40805-2, 2013, pp. 1-85.

Kim et al., "Implementation of Rectangular Slit-Inserted Ultra-Wideband Tapered Slot Antenna", SpringerPlus, 5:1387, 2016, pp. 1-11.

Tumialan, "Linearly Tapered Slot Antenna", Master's Thesis, New Jersy Institute of Technology, Dec. 1995, pp. 1-72.

Nourinia et al., "Numerical Solutions and Finind Optimal Quantities for Critical Parameters of TSA End-Fire Antennas", 10th WSEAS Intl. Conf. on Communications, Jul. 2006.

Acedo et al., "Study and Design of a Differencially Fed Tapered Slot Antenna Array", IEEE Trans. on Antennas and Propagation, Feb. 2010, pp. 1-11.

P.J. Gibson, "The Vivaldi Aerial", 9th European Microwave Conference Proceedings, righton, Sep. 17-20, 1979, pp. 101-105.

* cited by examiner

MODULAR TAPERED SLOT ANTENNA FEED STRUCTURE METHOD OF USE AND KIT

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, CA, 92152; voice: (619) 553-5118; email: NIWC_Pacific_T2@navy.mil. Reference Navy Case Number 211531.

BACKGROUND OF THE INVENTION

Field of the Invention

The present invention relates generally to radio frequency antennas and communications systems. More particularly, the present invention relates to a modular feed structure for a tapered slot antenna and methods of use and manufacturing.

Description of Related Art

The exponential tapered slot antenna, also known as the "Vivaldi" antenna, was first discussed in P. J. Gibson, "*The Vivaldi Aerial*", The IEEE 9$^{th}$ European Microwave Conference Proceedings, Brighton, 17-20 Sep. 1979, pp. 101-105. In the abstract of this paper, Gibson describes the tapered slot antenna as "a new member of the class of aperiodic continuously scaled antenna structures, as such, it has theoretically unlimited instantaneous bandwidth." Since the time of the Gibson paper, the tapered slot antenna has become a widely used, relatively small, compact, broadband, directional antenna, with many taper profile variants.

A conventional tapered slot antenna is characterized by two metalized blades with a tapered slot having an antenna feed at the narrowest gap in the taper between the blades. Because the blades are gapped for the antenna feed, additional structural elements may be required to support the two blades in their gapped position for use in radiating radio frequency (RF) energy for various RF applications.

FIGS. 1A and 1B are two images of such a conventional tapered slot antenna 50. More particularly, FIG. 1A illustrates the conventional tapered slot antenna 50 with upper blade 52 and lower blade 54 held in place by a conventional support bracket 56. FIG. 1B is an enlargement of the image of a conventional tapered slot antenna 50 as indicated on FIG. 1A by a dashed box. More particularly FIG. 1B illustrates in greater detail the upper blade 52 separated from lower blade 54 to form a feed gap 60. FIG. 1B further illustrates the conventional support bracket 56 and set screws 58 used to support an upper blade 52 relative to a lower blade 54 and thereby establishing the feed gap 60 where RF energy is introduced to the antenna 50.

Conventionally manufactured tapered slot antenna designs, like antenna 50 shown in FIGS. 1A and 1B, often require support brackets 56 with multiple set screws 58 to hold the antenna blades 52 and 54 in place. Additionally, the set screws 58 are used to fine tune the antenna performance by adjusting the feed gap 60. This may take many rounds of testing and tuning to achieve the desired RF performance. This repetitive tuning and testing impacts the antenna design process. Additionally, there is the potential for set screws to come loose and negatively disrupt performance of such antennas.

The use of support brackets 56 and set screws 58 make it difficult to swap out one of the two blades 52 and 54 without having to finely tune the feed gap 60. For example, it would be advantageous to have an antenna design that allows for rapid swapping of the blades while maintaining feed gap 60 static and repeatable during design and performance testing. The support bracket 56 and set screws 58 of a conventional antenna 50 make this very time consuming.

In view of the foregoing and for other reasons that will become more clear, there exists a need in the art for modular feed structures for a tapered slot antenna, tapered slot antenna and antenna kits incorporating such feed structures and methods of use and manufacturing.

SUMMARY OF THE INVENTION

An embodiment of a tapered slot antenna is disclosed. The embodiment of a tapered slot antenna may include an upper blade including a proximal lock end, an upper distal end, a tapered bottom edge, an upper left side and an upper right side. The embodiment of a tapered slot antenna may further include a lower blade including a proximal key end, a lower distal end, a tapered top edge, a lower left side and a lower right side. The embodiment of a tapered slot antenna may further include the proximal lock end configured for selective attachment within the proximal key end thereby forming a fixed feed point gap between the tapered bottom edge and the tapered top edge.

An embodiment of a method for using a tapered slot antenna is disclosed. The method may include providing a tapered slot antenna. The antenna provided may include an upper blade including a proximal lock end, an upper distal end, a tapered bottom edge, an upper left side and an upper right side. The antenna provided may further include a lower blade including a proximal key end, a lower distal end, a tapered top edge, a lower left side and a lower right side. The antenna provided may further include the proximal lock end configured for selective attachment within the proximal key end thereby forming a fixed feed gap between the tapered bottom edge and the tapered top edge. The method may further include assembling the tapered slot antenna by inserting the proximal lock end into the proximal key end with the tapered bottom edge facing the tapered top edge. The method may further include providing a coaxial cable having a first end, a second end, an inner conductor and an outer conductor. The method may further include placing a first end of the coaxial cable within the tapered slot antenna such that the inner conductor passes through the fixed feed gap for electrical connection to the upper blade and the outer conductor is in electrical connection with the lower blade. The method may further include providing a radio frequency (RF) source configured for connection to the second end of the coaxial cable. The method may further include connecting the RF source to the second end of the coaxial cable. The method may further include energizing the tapered slot antenna from the RF source via the coaxial cable.

An embodiment of a tapered slot antenna kit is disclosed. The antenna kit may include an upper blade including a proximal lock end including at least one male lock member, an upper distal end, a tapered bottom edge, an upper left side and an upper right side. The antenna kit may further include a lower blade including a proximal key end including at least one female key receptacle configured to selectively receive the at least one male lock member in a locked position, a lower distal end, a tapered top edge, a lower left side and a lower right side. The antenna kit may further include the locked position defining a fixed feed gap between the tapered bottom edge and the tapered top edge of the tapered slot antenna.

Additional features and advantages of the invention will be apparent from the detailed description which follows, taken in conjunction with the accompanying drawings, which together illustrate, by way of example, features of embodiments of the present invention.

BRIEF DESCRIPTION OF THE DRAWINGS

The following drawings illustrate exemplary embodiments for carrying out the invention. Like reference numerals refer to like parts in different views or embodiments of the present invention in the drawings.

DETAILED DESCRIPTION

Figure 1A:
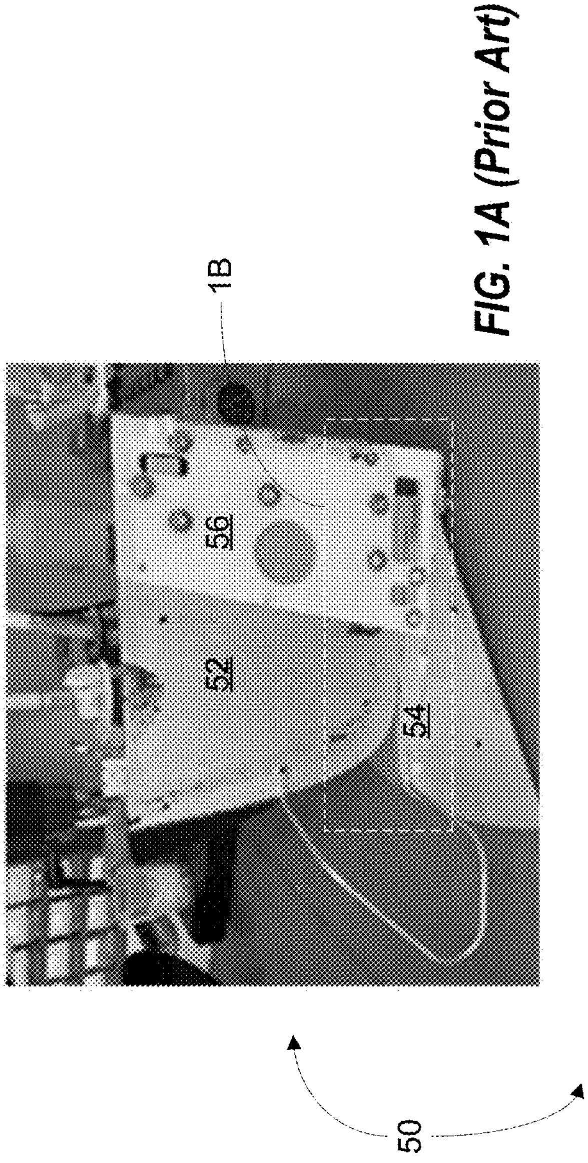
FIG. 1A (Prior Art)
FIG. 1A is an image of a conventional tapered slot antenna illustrating a conventional bracket and screws used to support an upper blade relative to a lower blade.

The disclosed methods and systems below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless specifically otherwise stated.

Rapid development, cost reduction, and ability to optimize the design is critical to any product design phase. The inventors of this modular tapered slot feed structure were keenly aware of the challenges facing RF antenna design, mechanical engineering and testing of tapered slot antennas. Conventional antenna systems may be traditionally manufactured as individual components and then tuned to achieve the correct performance. Alternatively, additive manufacturing has allowed antenna structures to be formed as a single piece. Additive manufactured antenna designs are often printed as a single piece, to avoid tolerance and spacing issues. However, additive manufactured antennas can be difficult to manufacture using 3D printers, particular for large structures, as they may require more support material, time to manufacture, and often crack more easily due to thin-walled areas. If printed in a single piece via additive manufacturing, the antenna would be very difficult to build within the 3D printer and requires time consuming post-processing methods to ensure the antenna is held together efficiently. These shortcomings in the art of RF antenna design, and for tapered slot antennas in particular, motivated the inventors to solve at least some of these problems with the present invention.

The modular design of a tapered slot antenna feed structure of the present invention include many features and advantages that are advantageous relative to the conventional antenna designs. One particular feature is a physical "lock and key" support design that is easy to use, provides ruggedized, accurate and repeatable feed gap structures with improved tapered slot antenna performance. The split design of the tapered slot antenna is modular with essentially two components, i.e., an upper blade and a lower blade. The embodiments of modular tapered slot antenna feed structures disclosed herein incorporate upper 114 and lower 116 locking flanges which are useful in further securing the upper 152 and lower 154 blades of a given tapered slot antenna embodiment, see FIGS. 2-8 and related description herein.

The modular aspect of the tapered slot antenna embodiments disclosed herein is easier to additively manufacture (AM) because of reduced post-processing and support material use. The embodiments of modular tapered slot antenna feed structures disclosed herein can be rapidly swapped out (upper or lower blade) while maintaining all other antenna and system performance characteristics.

Figure 1B:
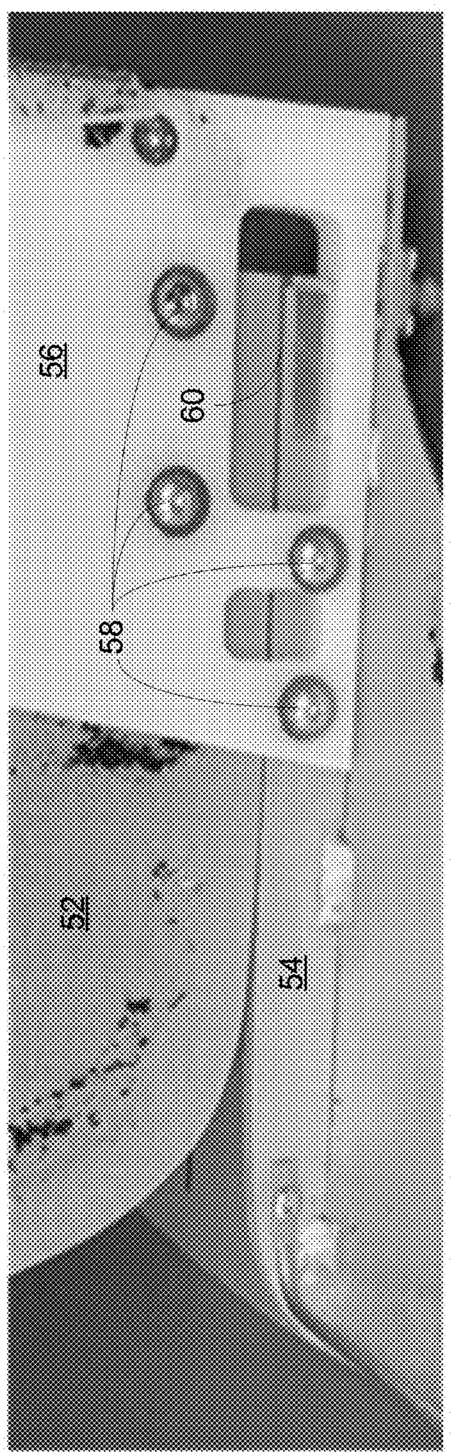
FIG. 1B (Prior Art)
FIG. 1B is a close-up image of the conventional tapered slot antenna shown in FIG. 1A, illustrating the conventional bracket and screws used to support an upper blade relative to a lower blade.

The embodiments of modular tapered slot antenna feed structures disclosed herein eliminate the need for set screws 58 or other performance tuning components and their inherent disadvantages. Moreover, eliminating conventional support brackets 56 such as those shown in FIGS. 1A and 1B, eliminates reflections caused by changed boundary conditions near the feed point. This is because the use of plastic support brackets 56 near the feed point changes the boundary conditions of the tapered slot from air to plastic to air, which creates reflections on the energy travelling from the feed through the antenna and degrades the performance. The embodiments of modular tapered slot antenna feed structures disclosed herein provide consistent antenna feed impedance over multiple iterations in the additive manufacturing process.

The use of AM (3D printing) in plastic for the underlying upper 152 and lower 154 blade structures allows for post-manufacturing metallization of the plastic via electroless plating, electroplating, conductive painting any other suitable metallization technique consistent with the teachings of the present invention. Because the upper 152 and lower 154 blades of a given tapered slot antenna embodiment are suitable for AM, complex shapes and various taper profiles may be manufactured that might not be cost effective when traditionally manufactured. Finally, the physical "lock and key" support design of the present invention is made of plastic, not formed of metal or metal plated (metallized), and thus does not affect the performance of the antenna incorporating same.

Embodiments of the present invention include modular tapered slot antenna feed structures, methods of use and kits for same. More particularly, embodiments of this invention provide a more flexible platform for antenna design by utilizing a repeatable modular split design at the antenna feed point. The novel "lock and key" support column creates a sturdy yet simple combination of design elements to hold the tapered slot antenna feed point together, while making it significantly easier to manufacture, or replace underperforming parts without sacrificing the entire system. Embodiments of the invention may be used in parallel with additive manufacturing (3D printing) and allows users to improve manufacturing of antennas and repeatability of the antenna return loss and gain performance. Additional detailed description of various embodiments of a modular tapered slot antenna feed structure follows with reference to the drawings.

Figure 2:
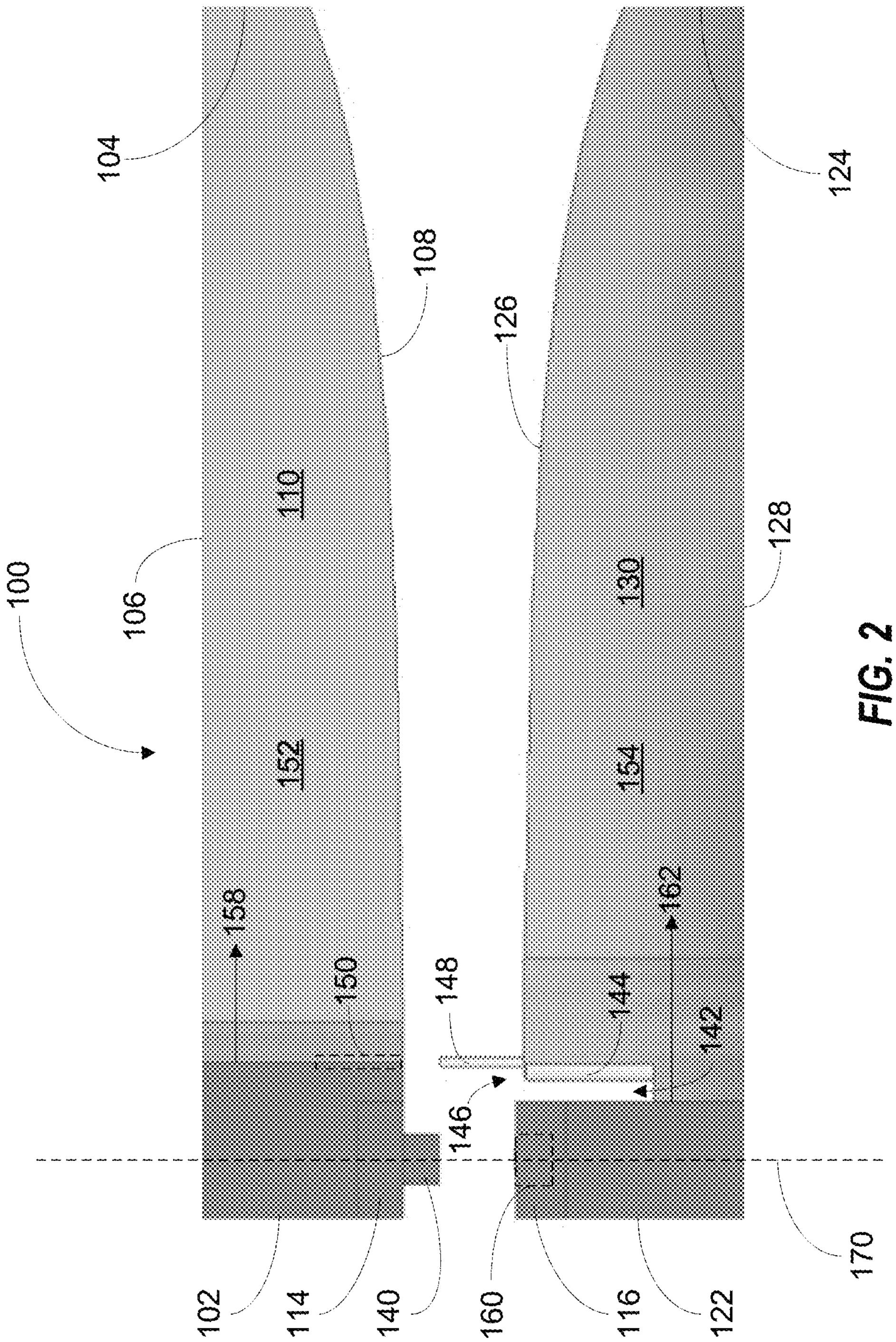
FIG. 2 is a left side view of a tapered feed slot antenna including a modular tapered slot antenna feed structure in an unlocked configuration, according to the present invention.
Figure 3:
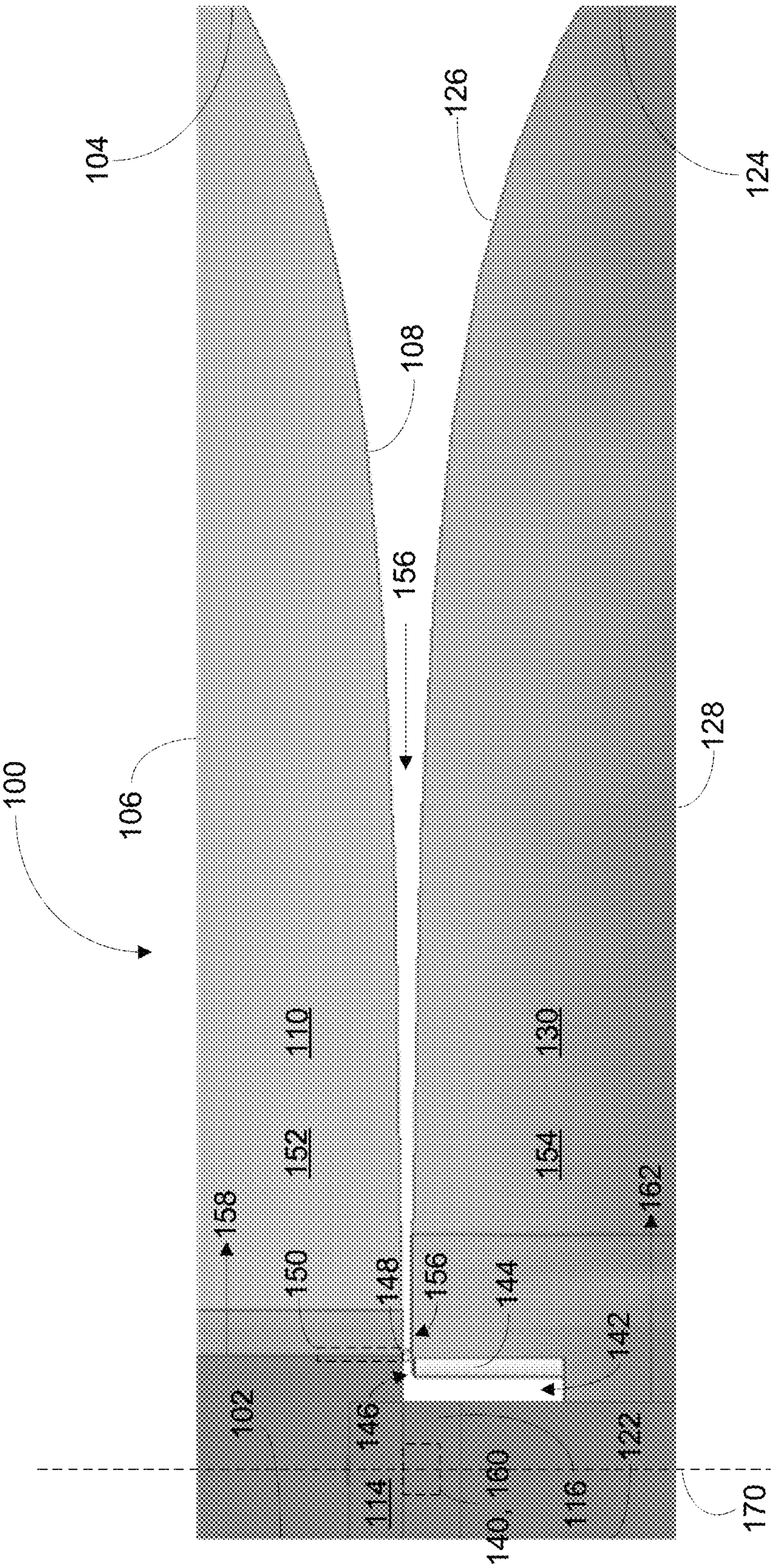
FIG. 3 is a left side view of a tapered feed slot antenna shown in FIG. 2 in a locked configuration, according to the present invention.

FIG. 2 is a left side view of a tapered slot antenna feed structure 100 in an unlocked position or configuration, according to the present invention. FIG. 3 is a left side view of a tapered feed slot antenna shown in FIG. 2 in a locked configuration, according to the present invention. The following description relates to both FIGS. 2 and 3 except where noted. More particularly FIGS. 2 and 3 illustrates an upper blade 152 and a lower blade 154. The embodiment of an upper blade 152 may include a proximal lock end 102, an upper distal end 104, a linear top edge 106, a tapered bottom edge 108, an upper left side 110 and an upper right side 112 (not shown in FIGS. 2 and 3, but inherently opposite upper left side 110). Proximal lock end 102 may further be configured with upper locking flanges 114, one visible in FIGS. 2 and 3 extending from the upper left side 110, the other not visible in FIGS. 2 and 3, but extending from the upper right side 112. The embodiment of a lower blade 154 may include a proximal key end 122, a lower distal end 124, a tapered top edge 126, a linear bottom edge 128, a lower left side 130 and a lower right side 132 (not shown in FIGS. 2 and 3, but inherently opposite lower right side 130). Proximal key 122 may also be configured with lower locking flanges 116, one visible in FIGS. 2 and 3 extending from lower left side 130, the other not visible in FIGS. 2 and 3, but extending from the lower right side 132.

The embodiment of upper blade 152 may further include a male lock member 140 extending from the tapered bottom edge 108 of the proximal lock end 102, as best shown in FIG. 2. The cross-section of male lock member 140 may take any suitable shape that corresponds with an opening, or female key 160 shown as a dashed rectangle in FIGS. 2 and 3 located within proximal key end 122 of lower blade 154. In the absence of other structural support, the length and cross-sectional shape of male lock member 140 and corresponding female key receptacle 160 may be configured to provide structural support to the upper blade 152 relative to the lower blade 154 in the locked position or configuration as best shown in FIG. 3. The length and cross-sectional shape of male lock member 140 and corresponding female key 160 may further be configured to counteract the moment (or rotational torque) tending to collapse the feed gap 156 (FIG. 3) from the distal ends 104 and 124 under gravitational force. Alternatively, additional support structure (not shown in the FIGS.) could be used to support the upper blade 152 relative to the lower blade 154 from collapsing together towards the distal end. Finally, the cross-sectional shape of male lock member 140 and corresponding female key 160 are preferably configured to prevent axial rotation about lock and key axis 170 and when in the locked configuration, thus providing a repeatable and precise feed gap 156 (FIG. 3) during assembly of the upper 152 and lower 154 blades.

As noted above, the embodiment of lower blade 154 shown in FIGS. 2 and 3 includes a female key receptacle 160, shown graphically as a dashed box in FIGS. 2 and 3, extending into proximal key end 122. The embodiment of lower blade 154 may further include a lower contact receptacle 142 configured to receive an outer conductor 144 of a coaxial cable 146 in an interference fit therein. Windows or cut-outs provided in an embodiment of a lower contact receptacle 142, otherwise generally cylindrical in shape, allow for the application of metallization and epoxy that may be used to secure the outer conductor 144 of the coaxial cable within the lower contact receptacle 142. The inner conductor 148 of the coaxial cable 146 may be configured to extend perpendicularly from tapered top edge 126 of the lower blade 154, passing through feed gap 156 and configured to interference fit within a corresponding upper contact receptacle 150 shown as a dashed rectangle on upper blade 152 in the locked position or configuration illustrated in FIG. 3.

The coaxial cable 146 with it associated outer conductor 144 and inner conductor 148 and a RF source (not shown) may be used to feed RF energy into the feed gap 156 (best shown in FIG. 3) for radiating out of a tapered slot feed antenna (only a portion of which is shown in FIGS. 2 and 3) incorporating the modular tapered slot antenna feed structure 100 shown in FIGS. 2 and 3. It will be understood that the modular tapered slot antenna feed structure 100 may be incorporated into further RF communications subsystems including a complete tapered slot feed antenna, a reflector dish and other communications equipment known to those of ordinary skill in the art.

The embodiment of a modular tapered slot antenna feed structure 200 shown in FIGS. 2 and 3 include an upper metallization layer, illustrated graphically as arrow 158 beginning at non-metallization interface, disposed on the upper contact receptacle 150, the upper distal end 104, the linear top edge 106, the tapered bottom edge 108, the upper left side 110 and the upper right side 112 of the upper blade 152. In the locked configuration shown in FIG. 3, the upper metallization layer is in direct contact with inner conductor 148 of the coaxial cable 146 when installed within the lower contact receptacle 142. Additionally, a lower metallization layer, illustrated graphically as arrow 162 beginning at non-metallization interface, is also disposed on the lower contact receptacle 142, the lower distal end 124, the tapered top edge 126, the bottom linear edge 128, the lower left side 130 and the lower right side 132 of the lower blade 154. When the coaxial cable 146 installed within the lower contact receptacle 142, the outer conductor 144 is in direct contact with the lower metallization layer.

Figure 4:
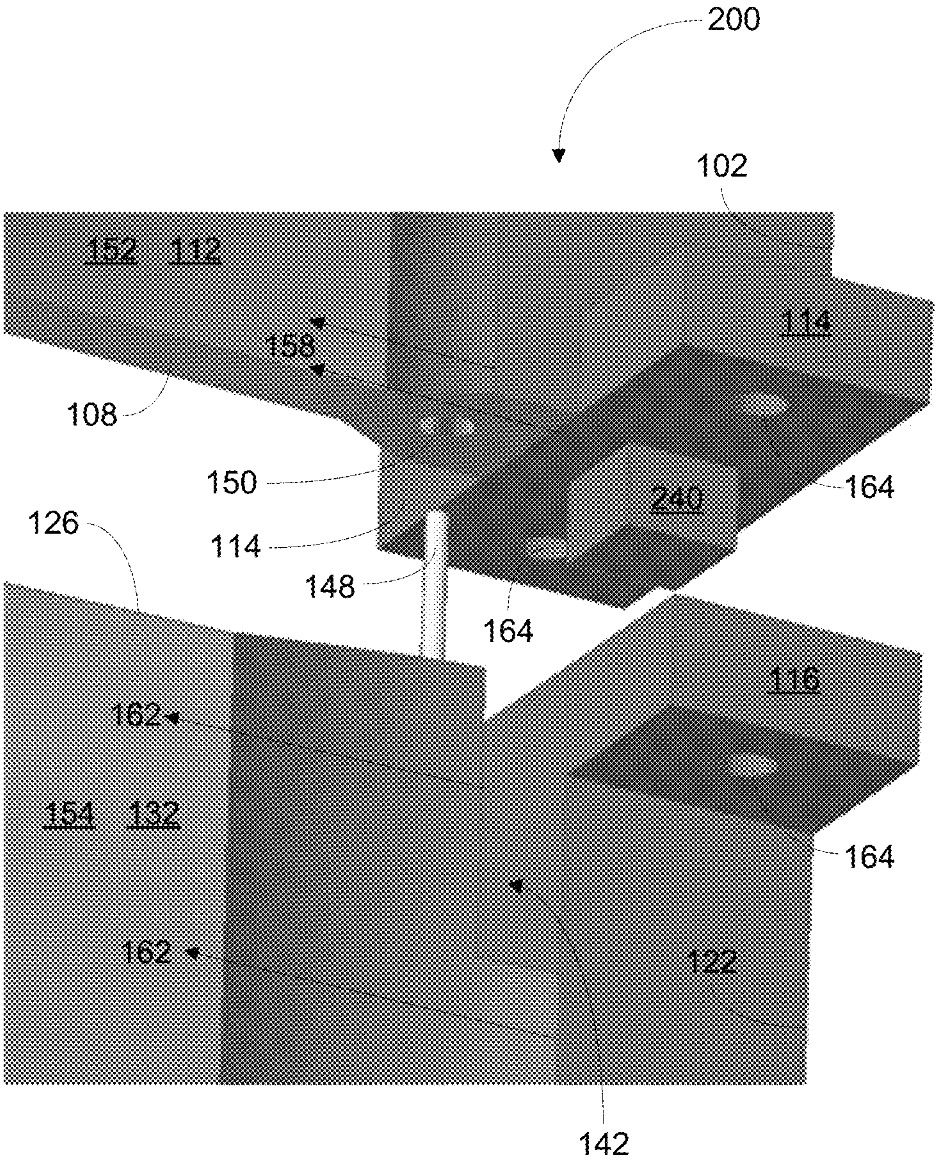
FIG. 4 is a lower right perspective close-up view of another embodiment of a modular tapered slot antenna feed structure with a rectangular or square cross-sectioned lock and key in the unlocked configuration, according to the present invention.

FIG. 4 is a lower right perspective close-up view of another embodiment of a modular tapered slot antenna feed structure 200 with a rectangular or square cross-sectioned lock and key in the unlocked configuration, according to the present invention. FIG. 4 best illustrates upper contact receptacle 150, inner conductor 148, a rectangular or square cross-sectioned male lock member 240, upper locking flanges 114 and one lower locking flange 116. A counterpart square or rectangular cross-sectioned female receptacle (not visible in FIG. 4) is disposed in the top surface of proximal key end 122 of lower blade 154. It will be understood that the location of male lock member 240 and the female receptacle 260 may be reversed according other embodiments (not illustrated). Other variations could include multiple male members and counterpart female members. The illustrated embodiment of the modular tapered slot antenna feed structure 200 shown in FIG. 4 further illustrates through holes 164 (three visible) passing through each locking flange 114 and 116. Counterpart through holes 164 may be aligned in counterpart locking flanges 114 and 116 and may accommodate bolts and nuts (not shown for simplicity) for tightly securing the upper blade 152 to the lower blade 154.

The upper blade 152 shown in FIG. 4 also illustrates upper right side 112, tapered bottom edge 108, proximal lock end 102 and upper metallization layer 158, shown as two arrows 158 originating from the non-metallization interfaces of the proximal lock end 102. The lower blade 154 further illustrates lower right side 132, tapered top edge 126, proximal key end 122 and lower metallization layer 162, shown as two arrows 162 originating from non-metallization interfaces with the proximal key end 122.

An embodiment of the male lock member 240 may have a square or rectangular cross-section, as shown in FIG. 4. However, it will be understood that other suitable male locking member cross-sections are also contemplated to be within the scope of the present invention. Two such alternative embodiments are illustrated in FIGS. 5 and 6.

Figure 5:
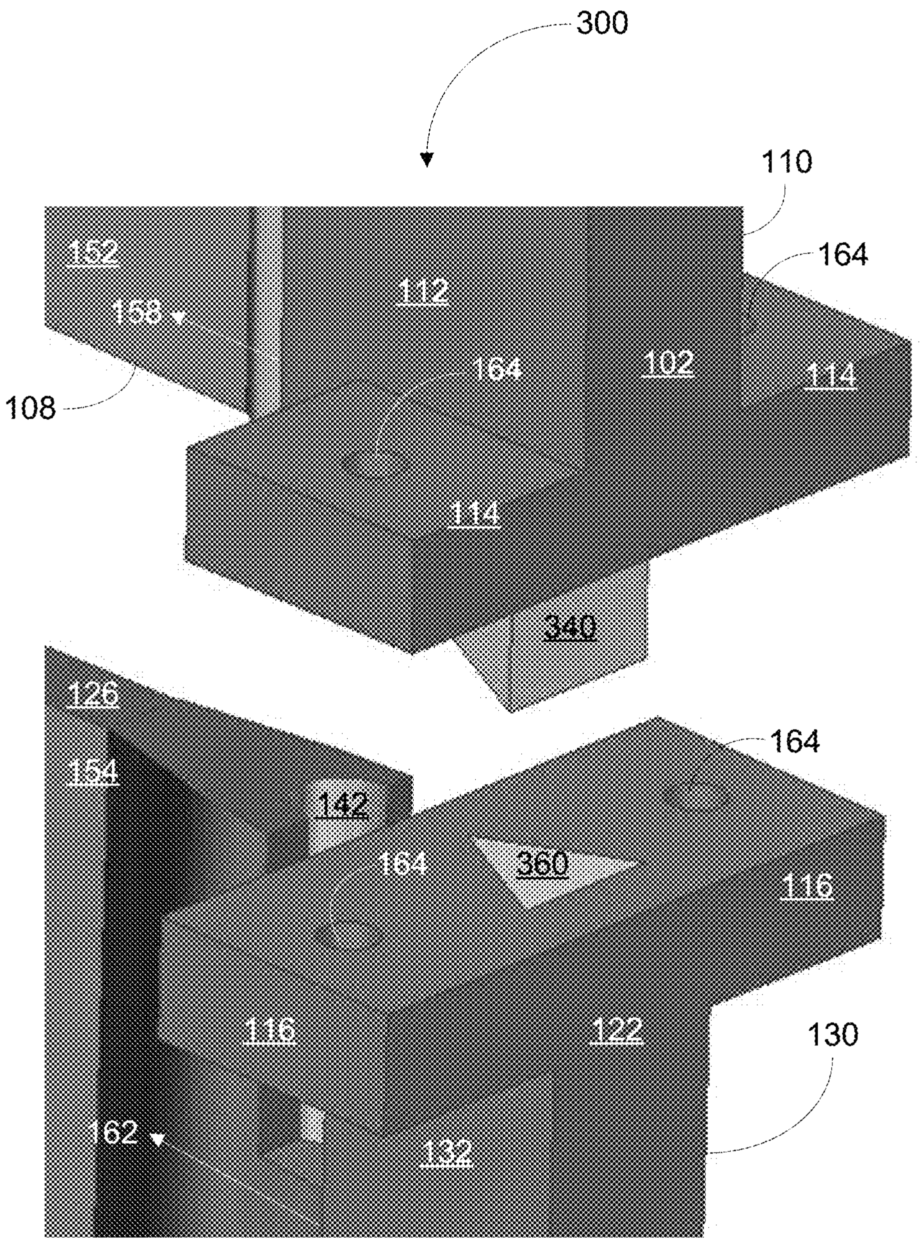
FIG. 5 is an upper right rear perspective close-up view of another embodiment of a modular tapered slot antenna feed structure with a triangular cross-sectioned lock and key in the unlocked configuration, according to the present invention.

FIG. 5 illustrates an upper right rear perspective close-up view of another embodiment of a modular tapered slot antenna feed structure 300 with a triangular cross-sectioned lock and key in the unlocked configuration, according to the present invention. As illustrated in FIG. 5 structure 300 may be configured with a triangular cross-sectioned male lock member 340 extending from a bottom surface of proximal lock end 102 of upper blade 152. The triangular cross-sectioned male lock member 340 is configured to mate within a counterpart triangular cross-sectioned female key member 360 disposed within the top surface of proximal key end 122 when in a locked configuration. FIG. 5 further illustrates tapered top edge 126, lower contact receptacle 142, through holes 164 passing through each lower locking flange 116 extending perpendicular from the lower left 130 and lower right 132 sides of proximal key end 122. The portion of upper blade 152 illustrated in FIG. 5 further illustrates tapered bottom edge 108, upper locking flanges 114 extending perpendicularly from the upper left side 110 and upper right side 112 of proximal lock end 102. Each embodiment of an upper locking flange 114 may also be configured with through holes 164 configured for coaxial alignment with counterpart through holes in lower locking flanges 116.

It will be understood that the triangular cross-sectioned male lock 340 and female key receptacle 360 may be sized with sufficient width, depth and/or strength to counteract the moment (or rotational torque) tending to collapse the feed gap 156 (FIG. 3) from the distal ends 104 and 124 (neither shown in FIG. 5) under gravitational force, wind loading and any motion-related forces even without the use of nuts and bolts (not shown) in aligned through holes 164 in the locked configuration. It will be further understood that metallization layers (copper color in original drawings and illustrated with arrows 158 and 162 in FIGS. 2-4) will be placed on upper 152 and lower 154 blades just like modular tapered slot antenna feed structures 100 and 200 as disclosed herein for radiating the RF energy during operation.

Figure 6:
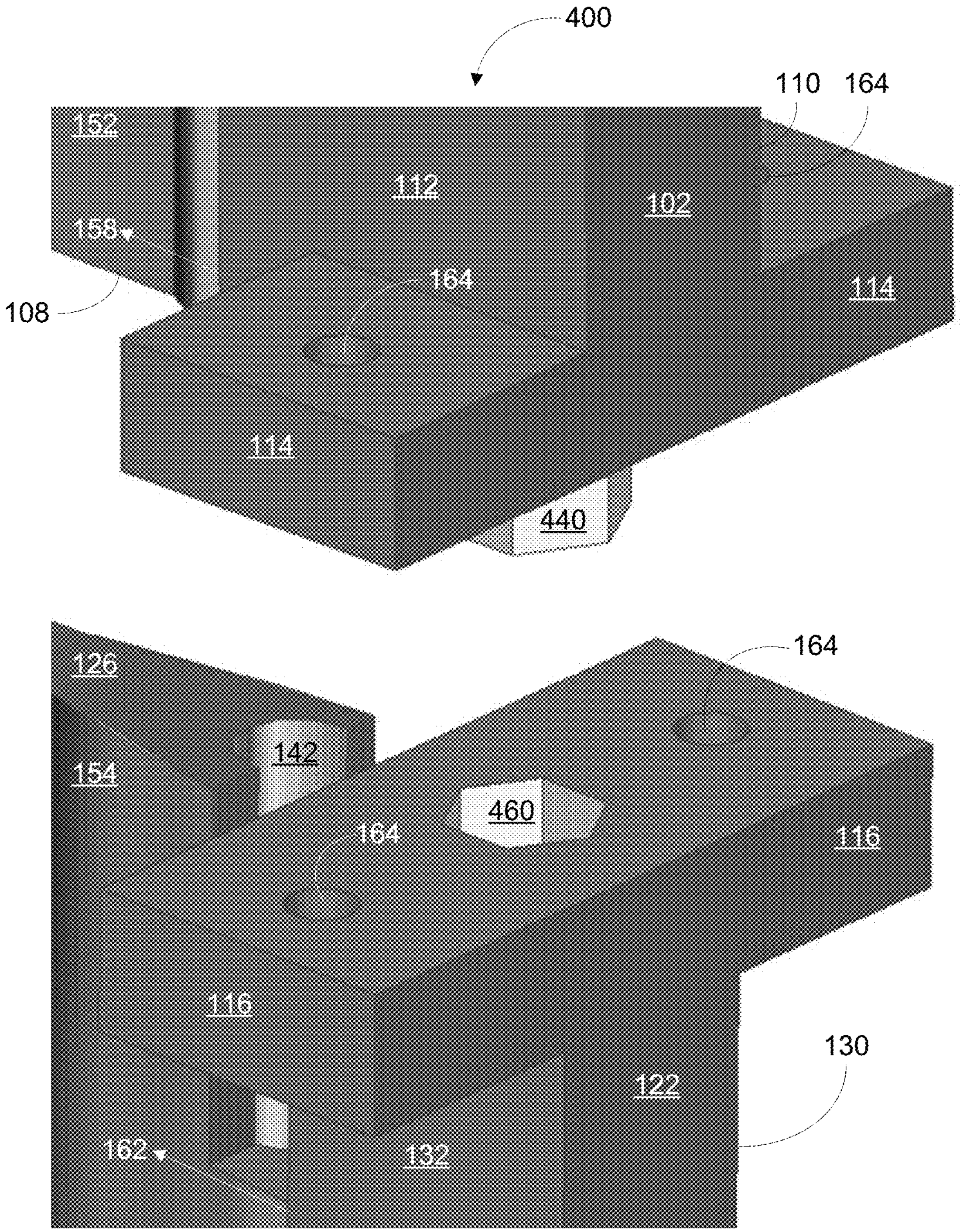
FIG. 6 is an upper right rear perspective close-up view of yet another embodiment of a modular tapered slot antenna feed structure with a hexagon cross-sectioned lock and key in the unlocked configuration, according to the present invention.

FIG. 6 is an upper right rear perspective close-up view of yet another embodiment of a modular tapered slot antenna feed structure 400 with a hexagon cross-sectioned lock and key in the unlocked configuration, according to the present invention. Hexagonal feed structure 400 is substantially similar to structures 200 and 300, except for the incorporation of a hexagon cross-sectioned male lock member 440 and corresponding hexagon cross-sectioned female key member 460. As illustrated in FIG. 6 hexagonal feed structure 400 may be configured with a hexagonal cross-sectioned male lock member 440 extending from a bottom surface of proximal lock end 102 of upper blade 152. The hexagonal cross-sectioned male lock member 440 is configured to mate within counterpart hexagonal cross-sectioned female key member 460 disposed within the top surface of proximal key end 122 when in a locked configuration. FIG. 6 further illustrates tapered top edge 126, lower contact receptacle 142, through holes 164 passing through each lower locking flange 116 extending perpendicular from the lower left 130 and lower right 132 sides of proximal key end 122.

The portion of upper blade 152 illustrated in FIG. 6 further illustrates tapered bottom edge 108, upper locking flanges 114 extending perpendicularly from the upper left side 110 and upper right side 112 of proximal lock end 102. Each embodiment of an upper locking flange 114 may also be configured with through holes 164 configured for coaxial alignment with counterpart through holes in lower locking flanges 116. It will be understood that the hexagon cross-sectioned male lock 440 and female key receptacle 460 will be sized with sufficient width, depth and/or strength to counteract the moment (or rotational torque) tending to collapse the feed gap 156 (FIG. 3) from the distal ends 104 and 124 (neither shown in FIG. 6) under gravitational force, wind loading and any motion-related forces even without the use of nuts and bolts (not shown) in aligned through holes 164 in the locked configuration. It will be further understood that metallization layers (copper color in original drawings and illustrated with arrows 158 and 162 in FIGS. 2-4) will be placed on upper 152 and lower 154 blades just like modular tapered slot antenna feed structures 100, 200 and 300 disclosed herein for radiating the RF energy during operation.

Figure 7:
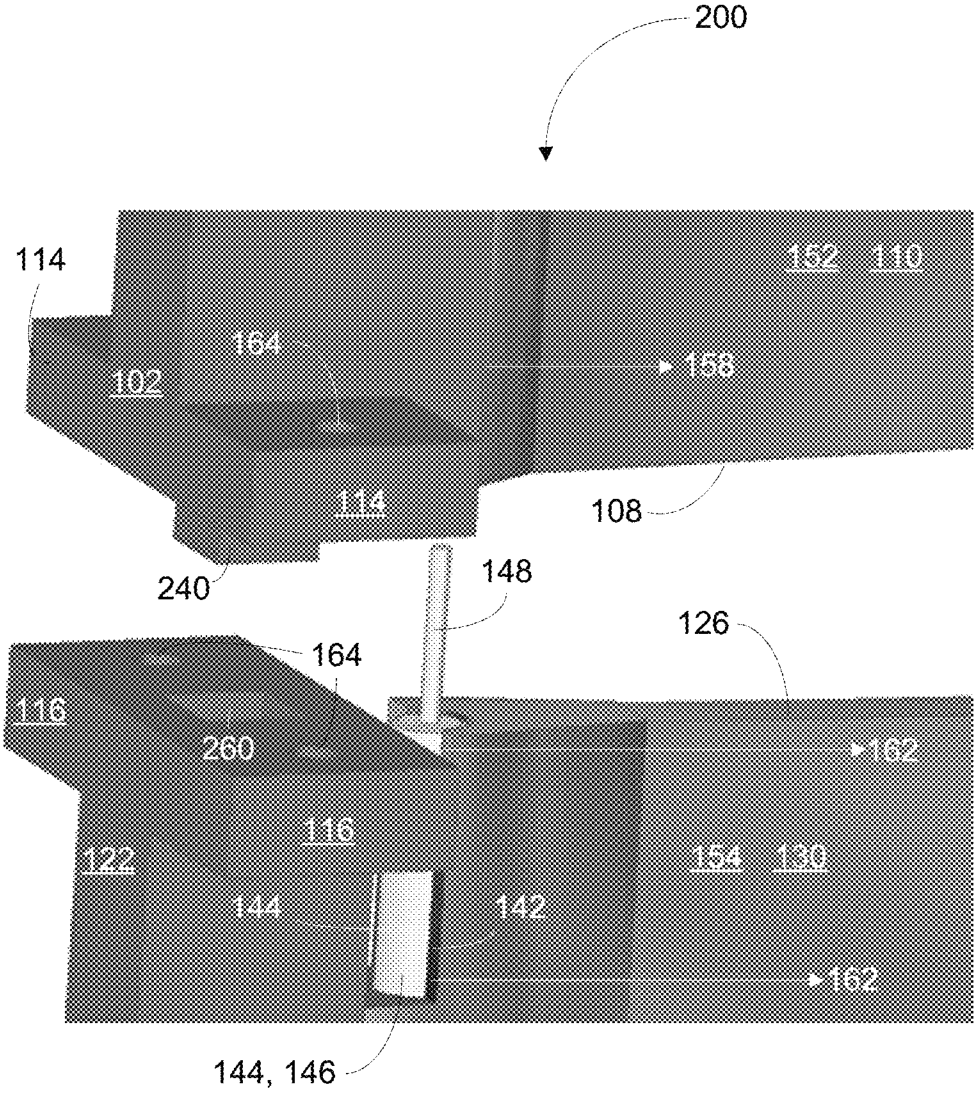
FIG. 7 is a upper left perspective close-up view of the embodiment of a modular tapered slot antenna feed structure, shown in FIG. 4, with a rectangular or square cross-sectioned lock and key in the unlocked configuration, according to the present invention.

FIG. 7 is a upper left perspective close-up view of the embodiment of a modular tapered slot antenna feed structure 200 with a rectangular or square cross-sectioned lock and key in the unlocked configuration, shown in FIG. 4. FIG. 7 best illustrates features visible on the lower left side 130 of the lower blade 154, in particular a coaxial feed including outer conductor 144 within lower contact receptacle 142 and inner conductor 148. The illustrated embodiment of lower blade 154 may further include a proximal key end 122 having a square or rectangle cross-section disposed in the top surface of proximal key end 122, through holes 164 (two visible on lower blade 154) passing through each lower locking flange 116, metallization layer 162 (see arrows 162) extending toward lower distal end 124 (not shown) and along tapered top edge 126. FIG. 7 also illustrates features of the upper blade 152, which may include a counterpart rectangular or square cross-sectioned male lock member 240 configured for interference fit within female key receptacle 260, proximal key end 122 with upper locking flanges 114 extending perpendicularly on opposed upper sides 110 and 112, with one of two through holes 164 visible. A metallization layer 158 (see arrow) originates from non-metallization interfaces with the proximal lock end 102 and including the upper contact receptacle 150 (not shown) and extends toward upper distal end 104 (also not shown). As noted elsewhere, counterpart coaxial through holes 164 may accommodate bolts and nuts (not shown for simplicity) for tightly securing the upper blade 152 to the lower blade 154 via upper 114 and lower 116 locking flanges.

Figure 8:
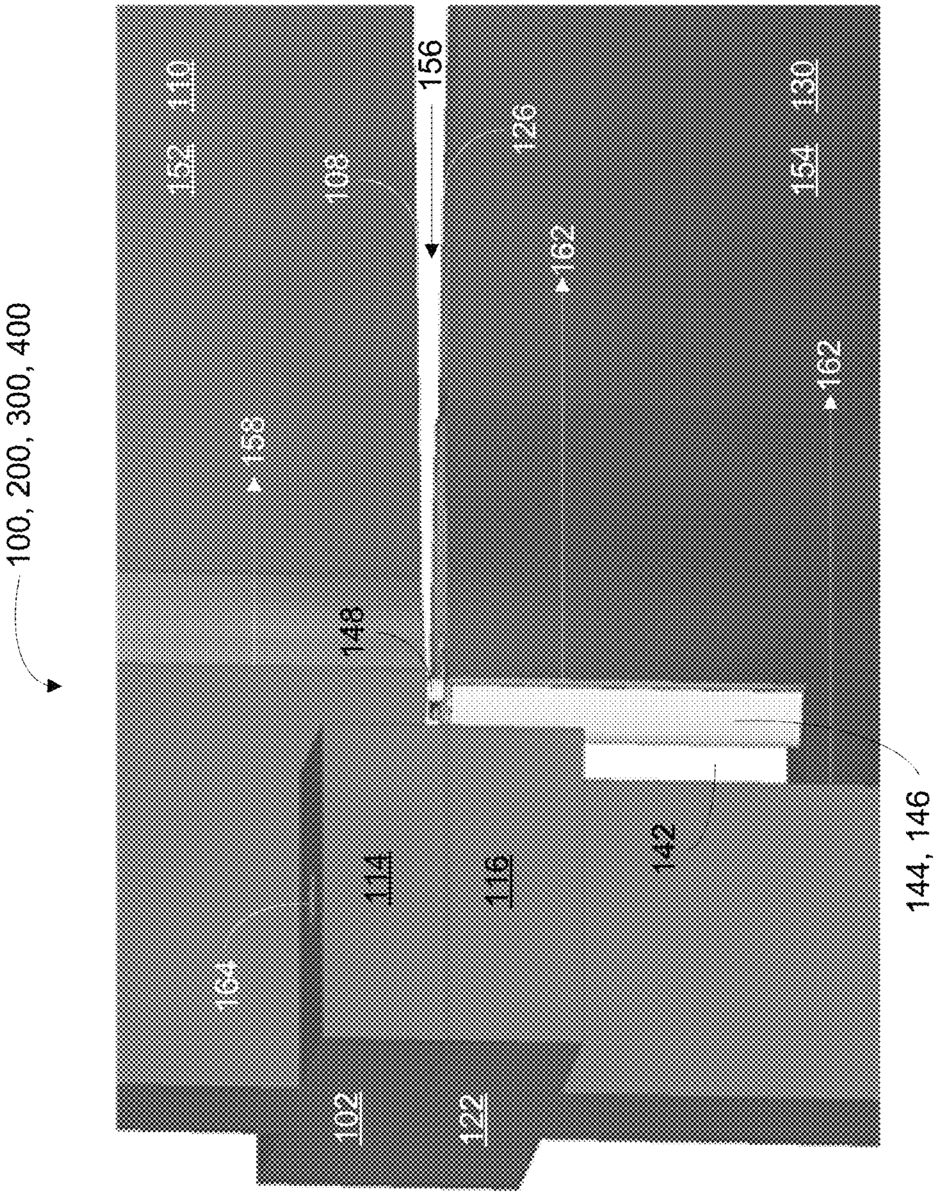
FIG. 8 is also an upper left perspective close-up view of the embodiment of a modular tapered slot antenna feed structure in the locked configuration, according to the present invention.

FIG. 8 is also an upper left perspective close-up view of the embodiment of a modular tapered slot antenna feed structure in the locked configuration, according to the present invention. The feed structure 100, 200, 300, 400 illustrated in FIG. 8 may have any suitable lock and key configuration as disclosed herein. The locked configuration shown in FIG. 7 best illustrates the tapered slot formed by opposed tapered bottom edge 108 facing tapered top edge 126 originating at feed gap 156, which is most narrow where the inner conductor 148 passes through the feed gap 156. FIG. 7 further illustrates how upper blade 152 and lower blade 154 fit together flush, with no gap between proximal lock end 102 and proximal key end 122. In the locked configuration of modular tapered slot antenna feed structure 200, through holes 164 are aligned on both pairs of upper 114 and lower 112 locking flanges and configured to receive a threaded bolt with locking nut (neither shown). Such nuts, bolts and any other means for securing proximal lock end 102 to proximal key end 122 are well within the knowledge of one of ordinary skill in the art and thus will not be illustrated or further discussed herein. It will also be understood that lower contact receptacle 142 as shown and described herein need not completely surround outer conductor 144, only that it makes electrical contact with the outer conductor 144 through an interference fit to metallization layer 162.

It will be understood that each embodiment of blade 152 and 154 used to form a modular tapered slot antenna feed structure 100, 200, 300, 400, 500 as disclosed herein may have a particular matched taper profile, i.e., tapered bottom edge 108 opposite tapered top edge 126 expanding from a proximal feed gap 156 out toward the upper 104 and lower 124 distal ends. The taper profile of each blade 152 and 154 shown in best in FIGS. 2-3 and to a lesser degree in FIGS. 4-8 are exponential (see also, FIG. 10A and related discussion herein). It will be understood that tapered slot antennas may have other suitable taper profiles for particular applications.

FIGS. 10A-H illustrate various embodiments of taper profiles suitable for use with embodiments of tapered slot antennas, according to the present invention. Note that the exemplary taper profiles illustrated in FIGS. 10A-H are not drawn to scale and are provided to simply illustrate different taper profiles side by side. It will be further understood that the exemplary taper profiles illustrated in FIGS. 10A-H are a non-exhaustive set of illustrations of taper profiles that may be used with the inventive modular tapered slot antenna feed structures 100, 200, 300 and 400 as disclosed herein. Each of the various embodiments of taper profiles shown in FIGS. 10A-H include a narrow feed gap on the left side that opens up toward the right according to particular taper profiles.

Figure 9:
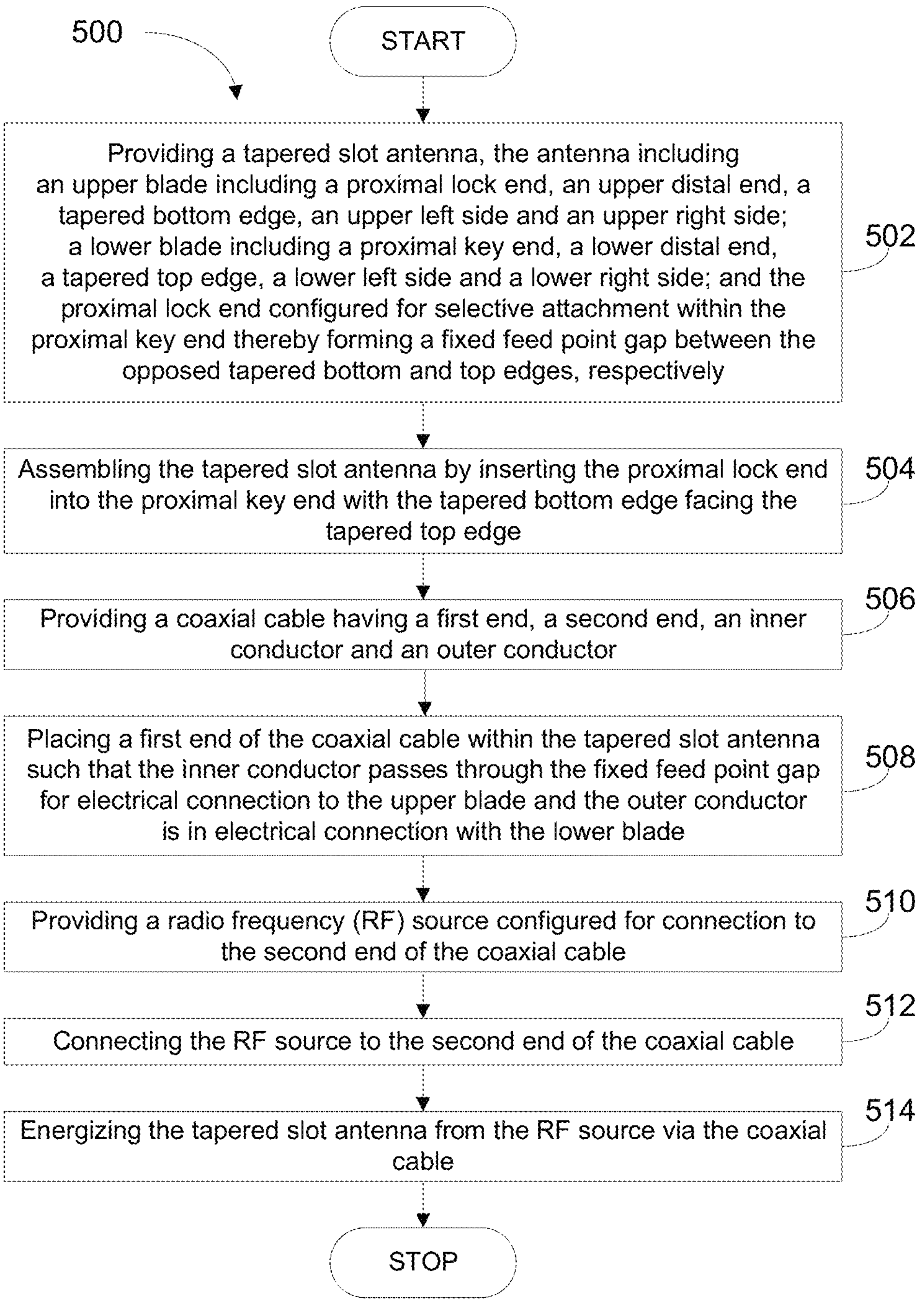
FIG. 9 is a flowchart of method of using a tapered slot antenna, according to the present invention.
Figure 10A:
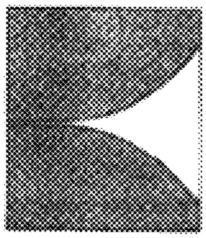
FIGS. 10A-H illustrate various embodiments of taper profiles suitable for use with embodiments of tapered slot antennas, according to the present invention.
Figure 10B:
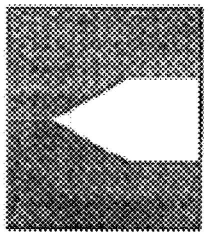
Figure 10C:
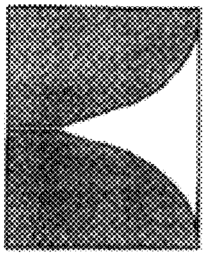
Figure 10D:
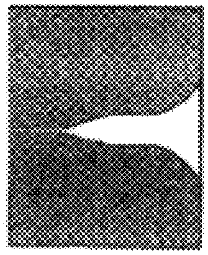
Figure 10E:
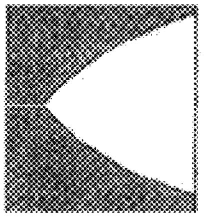
Figure 10F:
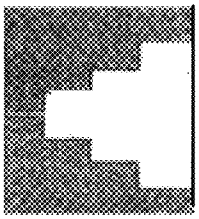
Figure 10G:
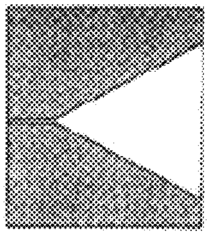
Figure 10H:
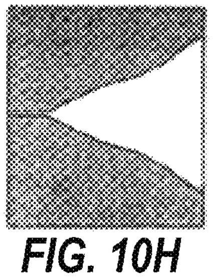

More particularly, FIG. 10A illustrates an embodiment of an exponential taper profile such as those illustrated in FIGS. 2-9. FIG. 10B illustrates an embodiment of a linear-constant taper profile, according to the present invention. FIG. 10C illustrates an embodiment of a tangential taper profile, according to the present invention. FIG. 10D illustrates an embodiment of an exponential-constant taper profile, according to the present invention. FIG. 10E illustrates an embodiment of a parabolic taper profile, according to the present invention. FIG. 10F illustrates an embodiment of a step-constant taper profile, according to the present invention. FIG. 10G illustrates an embodiment of a linear taper profile, according to the present invention. FIG. 10H illustrates an embodiment of a broken linear taper profile, according to the present invention. Additional description and information on the effects of a given taper profile are known to those of ordinary skill in the art, see, e.g., Unadkat, et al., "Design of Corrugated Linearly Tapered Slot Antenna for Wireless Apps: Theory and Principles", Lambert Academic Publishing, ISBN: 978-3-659-40805-2, 2013, the contents of which are hereby incorporated by reference for all purposes.

FIG. 9 is a flowchart of method 500 of using a tapered slot antenna, according to the present invention. Method 500 may include providing 502 a tapered slot antenna. The embodiment of an antenna provided at step 502 may include an upper blade including a proximal lock end, an upper distal end, a tapered bottom edge, an upper left side and an upper right side. The embodiment of an antenna provided at step 502 may further include a lower blade including a proximal key end, a lower distal end, a tapered top edge, a lower left side and a lower right side. The embodiment of an antenna provided at step 502 may further include the proximal lock end configured for selective attachment within the proximal key end thereby forming a fixed feed gap between the opposed tapered bottom and top edges, respectively.

Method 500 may further include assembling 504 the tapered slot antenna by inserting the proximal lock end into the proximal key end with the tapered bottom edge facing the tapered top edge. Method 500 may further include providing 506 a coaxial cable having a first end, a second end, an inner conductor and an outer conductor. Method 500 may further include placing 508 a first end of the coaxial cable within the tapered slot antenna such that the inner conductor passes through the fixed feed point gap for electrical connection to the upper blade and the outer conductor is in electrical connection with the lower blade. Method 500 may further include providing 510 a radio frequency (RF) source configured for connection to the second end of the coaxial cable. Method 500 may further include connecting the RF source to the second end of the coaxial cable. Finally, method 500 may further include energizing 514 the tapered slot antenna from the RF source via the coaxial cable.

According to another embodiment of method 500, the proximal lock end may further include at least one male lock member. According to this embodiment of method 500, the proximal key end may further include at least one female key receptacle configured to receive the at least one male lock member in a locked position. According to still another embodiment of method 500 the upper blade may further include an upper contact receptacle disposed within the tapered bottom edge between the proximal lock end and the upper distal end. According to this embodiment of method 500, the upper contact receptacle, the upper distal end, the tapered bottom edge, the upper left side and the upper right side may all include a metal coating. According to this embodiment of method 500, the upper contact receptacle may also be configured with an interference fit to accept an inner conductor from a coaxial cable. This interference fit in combination with metallization of the upper contact receptacle provides an electrical contact.

According to still another embodiment of method 500, the lower blade may further include a lower contact receptacle disposed within the tapered top edge between the proximal key end and lower distal end. According to this embodiment of method 500, the lower contact receptacle, the lower distal end, the tapered top edge, the lower left side and the lower right side may all have a metal coating (metallization). According to this embodiment of method 500, the lower contact receptacle may be configured with an interference fit to accept an outer conductor from a coaxial cable. This interference fit in combination with metallization of the lower contact receptacle provides an electrical contact.

According to yet another embodiment of method 500, the tapered edges may each include an exponential profile. According to various other embodiments of method 500, opposed tapered edges may include a profile other than exponential, for example and not by way of limitation, tangential, parabolic, linear, linear-constant, exponential-constant, step-constant and broken linear. Various exemplary slot profiles are shown in FIGS. 10A-10G.

The modular tapered slot antenna feed structures 100, 200, 300 and 400 disclosed herein, may be formed using additive manufacturing (AM) techniques. Such AM techniques to form modular tapered slot antenna feed structure components, e.g., upper 152 and lower 154 blades are well-known to one of ordinary skill in the art and thus will not be further elaborated herein. According to one embodiment, such components are formed of via metal additive manufacturing, obviating the need to add a metallization layer. According to the illustrated embodiment, the components are formed of a plastic material and then subsequently metallized using any suitable metallization technique, for example and not by way of limitation, electroless plating, electroplating, vapor deposition, or conductive paint. Such metallization over plastic techniques are known to one of ordinary skill in the art and thus will not be further elaborated herein.

Using AM techniques to form components of the modular tapered slot antenna feed structures disclosed herein allows for post 3D printing (AM) metallization of the usable antenna area while using the non-metallized areas to secure the antenna. This approach maintains antenna feed performance at the feed point. It will also be understood that the additively manufactured tapered slot antenna split feed designs described herein allow for greater flexibility in design, manufacturing, testing and fine-tuning phases of a given tapered slot antenna system and potentially reduced cost.

Assembly of the modular tapered slot antenna feed structures of the present invention is as simple as snapping two blade components together utilizing the "lock and key" feature and pillar supports according other embodiments. By splitting the antenna into separate upper and lower blade components, the resulting antenna may be used in more flexible configurations. For example, a particular upper blade design can be edited while the lower blade remains original, and when both blades utilize a split key design, swapping new upper and lower blades is simplified. Another benefit of the split key design is that any post-processing that is required for the part (e.g., sanding, cleaning, and/or metallization) it is much easier work with individual components when they are separated. Additionally, it is easier to additively manufacture smaller components rather than an entire antenna structure.

It is also important to note that RF feed gaps in tapered slot antennas are generally very tight spaces (0.01 inches or greater) and require precise finishes. RF feed gap dimensions are determined by the antenna's required RF input impedance. So, having the feed gap easily accessible is critical for repeatable antenna performance over a wide frequency range.

Particular embodiments of the tapered slot antenna feed structures have been described above with reference to the drawing FIGS. Descriptions of additional generic embodiment of the present invention follow. An embodiment of a tapered slot antenna is disclosed. The embodiment of a tapered slot antenna may include an upper blade including a proximal lock end, an upper distal end, a tapered bottom edge, an upper left side and an upper right side. Exemplary embodiments of an upper blade 152 are shown in FIGS. 2-8. The embodiment of a tapered slot antenna may further include a lower blade including a proximal key end, a lower distal end, a tapered top edge, a lower left side and a lower right side. Exemplary embodiments of a lower blade 154 are shown in FIGS. 2-8. The embodiment of a tapered slot antenna may further include the proximal lock end configured for selective attachment within the proximal key end thereby forming a fixed feed gap between the tapered bottom edge and the tapered top edge. Exemplary embodiments of a proximal lock end 102 and proximal key end 122 are shown in FIGS. 2-8. Exemplary feed gaps 156 are shown in FIGS. 3 and 8.

According to another embodiment of a tapered slot antenna the proximal lock end may further include at least one male lock member. Exemplary male lock members 140 are shown in FIGS. 2 and 3. Exemplary male lock members having specific cross-sections are shown in FIG. 4 (rectangular or square male lock member 240), FIG. 5 (triangular cross-sectioned male lock member 340) and FIG. 5 (hexagonal cross-sectioned male lock member 440). According to yet another embodiment of a tapered slot antenna the proximal key end may further include at least one female key receptacle configured to receive the at least one male lock member in a locked position. Exemplary female key members 160 are shown in FIGS. 2 and 3. Exemplary female key members having specific cross-sections are shown in FIG. 4 (rectangular or square female key member 260), FIG. 5 (triangular cross-sectioned female key member 360) and FIG. 5 (hexagonal cross-sectioned female key member 460).

According to one embodiment of a tapered slot antenna the upper blade may further include an upper contact receptacle disposed within the tapered bottom edge between the proximal lock end and the upper distal end. Exemplary embodiments of an upper contact receptacle 150 are shown in FIGS. 2-4 and are generally cylindrical in shape and configured with metallization for electrical contact through an interference fit with the inner conductor 148 of coaxial cable 146. According to yet another embodiment of a tapered slot antenna the upper contact receptacle, the upper distal end, the tapered bottom edge, the upper left side and the upper right side all have a metal coating (metallization). According to a specific embodiment of a tapered slot antenna, the upper contact receptacle may be configured with an interference fit to accept an inner conductor from a coaxial cable. This interference fit within the metallized upper contact receptacle provides electrical connection.

According to still another embodiment of a tapered slot antenna the lower blade may further include a lower contact receptacle disposed within the tapered top edge between the proximal key end and bottom distal end. According to still another embodiment of a tapered slot antenna, the lower contact receptacle, the lower distal end, the tapered top edge, the lower left side and the lower right side all comprise a metal coating. According to a particular embodiment of a tapered slot antenna, the lower contact receptacle may be configured with an interference fit to accept an outer conductor from a coaxial cable. This interference fit in combination with the metal coating within the lower contact receptacle provides an electrical contact.

According to one embodiment of a tapered slot antenna, the tapered edges may each include an exponential profile. Such exponential profiled tapered slot antennas are sometimes referred to as a "Vivaldi antenna". According to various other embodiments of a tapered slot antenna, counterpart tapered edges may each have a profile other than exponential, for example and not by way of limitation, tangential, parabolic, linear, linear-constant, exponential-constant, step-constant and broken linear. Various exemplary slot profiles are shown in FIGS. 10A-10G.

An embodiment of a tapered slot antenna kit is disclosed. The antenna kit may include an upper blade including a proximal lock end including at least one male lock member, an upper distal end, a tapered bottom edge, an upper left side and an upper right side. The antenna kit may further include a lower blade including a proximal key end including at least one female key receptacle configured to selectively receive the at least one male lock member in a locked position, a lower distal end, a tapered top edge, a lower left side and a lower right side. The antenna kit may further include the locked position defining a fixed feed gap between the tapered bottom edge and the tapered top edge of the tapered slot antenna.

According to another embodiment of a tapered slot antenna kit, the upper blade may further include an upper contact receptacle disposed within the tapered bottom edge between the proximal lock end and the upper distal end. According to this embodiment of a tapered slot antenna kit, the upper contact receptacle, the upper distal end, the tapered bottom edge, the upper left side and the upper right side all include a metal coating (metallization). According to this embodiment of a tapered slot antenna kit, the upper contact receptacle may be configured with an interference fit to accept an inner conductor from a coaxial cable. This interference fit in combination with metallization in the upper contact receptacle provides an electrical contact.

According to another embodiment of a tapered slot antenna kit, the lower blade may further include a lower contact receptacle disposed within the tapered top edge between the proximal key end and lower distal end. According to this embodiment of a tapered slot antenna kit, the lower contact receptacle, the lower distal end, the tapered top edge, the lower left side and the lower right side may all include a metal coating (metallization). According to this embodiment of a tapered slot antenna kit, the lower contact receptacle may also be configured with an interference fit to accept an outer conductor from a coaxial cable. Again, this interference fit in combination with metallization in the upper contact receptacle provides an electrical contact.

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Finally, terms of degree such as "substantially", "about" and "approximately" as used herein mean a reasonable amount of deviation of the modified term such that the end result is not significantly changed.

From the above description of the embodiments of the modular tapered slot antenna feed structure and methods of use, it is manifest that various alternative structures may be used for implementing features of the present invention without departing from the scope of the claims. The described embodiments are to be considered in all respects as illustrative and not restrictive. It will further be understood that the present invention may suitably comprise, consist of, or consist essentially of the component parts, method steps and limitations disclosed herein. The method and/or apparatus disclosed herein may be practiced in the absence of any element that is not specifically claimed and/or disclosed herein.

While the foregoing advantages of the present invention are manifested in the detailed description and illustrated embodiments of the invention, a variety of changes can be made to the configuration, design and construction of the invention to achieve those advantages. Hence, reference herein to specific details of the structure and function of the present invention is by way of example only and not by way of limitation.

What is claimed is:

1. A tapered slot antenna, comprising:

an upper blade including a proximal lock end, an upper distal end, a tapered bottom edge, an upper left side and an upper right side;

a lower blade including a proximal key end, a lower distal end, a tapered top edge, a lower left side and a lower right side; and the proximal lock end configured for selective attachment within the proximal key end thereby forming a fixed feed gap between the tapered bottom edge and the tapered top edge.

2. The tapered slot antenna according to claim 1, wherein the proximal lock end further comprises at least one male lock member.

3. The tapered slot antenna according to claim 2, wherein the proximal key end further comprises at least one female key receptacle configured to receive the at least one male lock member in a locked position.

4. The tapered slot antenna according to claim 1, wherein the upper blade further comprises an upper contact receptacle disposed within the tapered bottom edge between the proximal lock end and the upper distal end.

5. The tapered slot antenna according to claim 4, wherein the upper contact receptacle, the upper distal end, the tapered bottom edge, the upper left side and the upper right side all comprise a metal coating.

6. The tapered slot antenna according to claim 5, wherein the upper contact receptacle is configured with an interference fit to accept an inner conductor from a coaxial cable.

7. The tapered slot antenna according to claim 1, wherein the lower blade further comprises a lower contact receptacle disposed within the tapered top edge between the proximal key end and bottom distal end.

8. The tapered slot antenna according to claim 7, wherein the lower contact receptacle, the lower distal end, the tapered top edge, the lower left side and the lower right side all comprise a metal coating.

9. The tapered slot antenna according to claim 8, wherein the lower contact receptacle is configured with an interference fit to accept an outer conductor from a coaxial cable.

10. The tapered slot antenna according to claim 1, wherein the tapered edges are each comprised of an exponential profile.

11. The tapered slot antenna according to claim 1, wherein the tapered edges are each comprised of a profile selected from the group consisting of: tangential, parabolic, linear, linear-constant, exponential-constant, step-constant and broken linear.

12. A method of using a tapered slot antenna, the method comprising:

providing the tapered slot antenna, the antenna comprising:

an upper blade including a proximal lock end, an upper distal end, a tapered bottom edge, an upper left side and an upper right side;

a lower blade including a proximal key end, a lower distal end, a tapered top edge, a lower left side and a lower right side; and the proximal lock end configured for selective attachment within the proximal key end thereby forming a fixed feed gap between the tapered bottom edge and the tapered top edge;

assembling the tapered slot antenna by inserting the proximal lock end into the proximal key end with the tapered bottom edge facing the tapered top edge;

providing a coaxial cable having a first end, a second end, an inner conductor and an outer conductor;

placing a first end of the coaxial cable within the tapered slot antenna such that the inner conductor passes through the fixed feed gap for electrical connection to the upper blade and the outer conductor is in electrical connection with the lower blade;

providing a radio frequency (RF) source configured for connection to the second end of the coaxial cable;

connecting the RF source to the second end of the coaxial cable; and energizing the tapered slot antenna from the RF source via the coaxial cable.

13. The method according to claim 12, wherein the proximal lock end further comprises at least one male lock member and wherein the proximal key end further comprises at least one female key receptacle configured to receive the at least one male lock member in a locked position.

14. The method according to claim 12, wherein the upper blade further comprises an upper contact receptacle disposed within the tapered bottom edge between the proximal lock end and the upper distal end, wherein the upper contact receptacle, the upper distal end, the tapered bottom edge, the upper left side and the upper right side all comprise a metal coating and wherein the upper contact receptacle is configured with an interference fit to accept an inner conductor from a coaxial cable.

15. The method according to claim 12, wherein the lower blade further comprises a lower contact receptacle disposed within the tapered top edge between the proximal key end and lower distal end, wherein the lower contact receptacle, the lower distal end, the tapered top edge, the lower left side and the lower right side all comprise a metal coating and wherein the lower contact receptacle is configured with an interference fit to accept an outer conductor from a coaxial cable.

16. The method according to claim 12, wherein the tapered edges are each comprised of an exponential profile.

17. The method according to claim 12, wherein the tapered edges are each comprised of a profile selected from the group consisting of: tangential, parabolic, linear, linear-constant, exponential-constant, step-constant and broken linear.

18. A tapered slot antenna kit, the kit comprising:

an upper blade including a proximal lock end including at least one male lock member, an upper distal end, a tapered bottom edge, an upper left side and an upper right side;

a lower blade including a proximal key end including at least one female key receptacle configured to selectively receive the at least one male lock member in a locked position, a lower distal end, a tapered top edge, a lower left side and a lower right side; and wherein the locked position further defines a fixed feed gap between the tapered bottom edge and the tapered top edge.

19. The tapered slot antenna kit according to claim 18, wherein the upper blade further comprises an upper contact receptacle disposed within the tapered bottom edge between the proximal lock end and the upper distal end, wherein the upper contact receptacle, the upper distal end, the tapered bottom edge, the upper left side and the upper right side all comprise a metal coating and wherein the upper contact receptacle is configured with an interference fit to accept an inner conductor from a coaxial cable.

20. The tapered slot antenna kit according to claim 18, wherein the lower blade further comprises a lower contact receptacle disposed within the tapered top edge between the proximal key end and lower distal end, wherein the lower contact receptacle, the lower distal end, the tapered top edge, the lower left side and the lower right side all comprise a metal coating and wherein the lower contact receptacle is configured with an interference fit to accept an outer conductor from a coaxial cable.

* * * * *